United States Patent
Gillett (10) Patent No.: US 9,586,471 B2
(45) Date of Patent: Mar. 7, 2017

(54) ROBOTIC OMNIWHEEL

(71) Applicant: Carla R. Gillett, Sacramento, CA (US)

(72) Inventor: Carla R. Gillett, Sacramento, CA (US)

(73) Assignee: Carla R. Gillett, Sacramento ( * ) Notice: Subject to any disclaimer, the term of this patent is extended or adjusted under 35 U.S.C. 154(b) by 528 days.

(21) Appl. No.: 13/872,054

(22) Filed: Apr. 26, 2013

(65) Prior Publication Data
US 2014/0318879 A1    Oct. 30, 2014

(51) Int. Cl.
*B60K 7/00*    (2006.01)
*B60K 17/30*   (2006.01)

(52) U.S. Cl.
CPC ............ *B60K 7/0007* (2013.01); *B60K 17/30* (2013.01); *B60K 2007/0038* (2013.01); *B60K 2007/0092* (2013.01)

(58) Field of Classification Search
CPC .. A01D 34/008; A01D 2101/00; A01D 34/66; B62B 2202/404; B62B 5/0026; B62B 5/0076; B62B 2301/04; B62B 3/001; B62B 3/12; G05D 1/0272; G05D 1/0033; G05D 1/0234; G05D 1/0238; G05D 1/0242; G05D 1/0255; G05D 1/027; G05D 1/0278; G05D 1/028; G05D 1/0282; G05D 2201/0204; G05D 2201/0206; G05D 2201/0208; G05D 2201/02; B62D 5/0418; B62D 61/06; B62D 7/026; B62D 7/1509
USPC ........................................ 180/167, 168, 169
See application file for complete search history.

(56) References Cited

U.S. PATENT DOCUMENTS

| | | | | |
|---|---|---|---|---|
| 3,720,281 A | * | 3/1973 | Frownfelter | B60K 1/00 180/167 |
| 4,776,415 A | * | 10/1988 | Brice | A47D 13/043 180/11 |
| 4,815,008 A | * | 3/1989 | Kadonoff | G05D 1/0234 180/169 |
| 4,816,998 A | * | 3/1989 | Ahlbom | G05D 1/0272 180/167 |
| 5,137,103 A | * | 8/1992 | Cartmell | B62B 3/001 180/13 |
| 5,163,273 A | * | 11/1992 | Wojtkowski | A01D 34/008 180/168 |

(Continued)

*Primary Examiner* — John Walters (57) ABSTRACT

A robotic omniwheel system for motion comprising various components such as in wheel motor assemblies with brake, supportive hub and axle assemblies, strut and yoke assemblies for suspension, a motor device having controller for steering motion, a motorized universal joint for rocking motion, an active transmission rod to uniquely engage lift and expansion which are managed by a drive logic system comprising status control system and sensor array, laser radar, GPS, and as well as manual navigational control system including wireless remote control for communication and monitoring motion states for transport and to monitor power levels therein. As well, an electrical system includes battery array to furnish power for the robotic omniwheel array assemblies and to the electrical components via power cable. Accordingly, a navigational system can control components by a cell phone device and by a remote controller device with toggle switches, and also by a remote control panel having touch screen monitor and thusly allowing the robotic omniwheel array to move about in a holonomic manner for transport.

5 Claims, 7 Drawing Sheets (56) References Cited

U.S. PATENT DOCUMENTS 7,047,712 B1* 5/2006 Hunt ................. A01D 34/008
  56/6
2004/0112656 A1* 6/2004 Bowen ............... B60K 7/0007
  180/65.51

* cited by examiner

ROBOTIC OMNIWHEEL

CROSS REFERENCED TO RELATED APPLICATIONS

A notice of issuance for divisional patent application Ser. No. 12/655,569, Publication number: US20110162896 A1, file date Jan. 4, 2010, and published: U.S. Pat. No. 8,430,192 B2 Apr. 30, 2013 for Robotic Onmiwheel Vehicle.

STATEMENT REGARDING FEDERALLY SPONSORED RESEARCH & DEVELOPMENT

Non Applicable

THE NAMES OF PARTIES TO A JOINT RESEARCH AGREEMENT

Non Applicable

FIELD OF THE INVENTION

The present disclosure relates to a robotic omniwheel assembly for use in a vehicle platform which a modular yoke and strut assembly holonomically maneuvers during driving navigation.

BACKGROUND OF THE INVENTION

Related Art for Comparability

In the past various types of omniwheels and conventionally powered robot wheels have been used to drive a vehicle omni-directionally but those types of wheel assemblies do not prevent a bouncing ride and do not enhance balance and stability, cited art discusses a yoke and a strut supporting the wheel assemblies yet does address the power system wiring and cable obviously hanging loosely which can be easily snagged or damaged during transport and is also visually unappealing.

The present robotic omniwheel utilizes clever methods to solve this problem by ideally containing the power systems electrical wiring array inside the yoke and strut via a hollow conduit securing the cabling connections from omniwheel to the frame, and offers solutions for other problems that cited art does not achieve which are detailed.

Prior art does disclose hub wheels which can rotate at 90 degrees to turn a vehicle omnidirectional in a circle however those hub wheels do not steer at a full 360 degrees to pivot fore and aft in a robotic manner or raise the chassis higher then lower it back down.

This disclosure makes known novel robotic omniwheel technology that will change intelligent transportation by improving path navigation, controlled robotic motion states comprising: one or multiplied actuation methods including synchronized steering, rocking and lifting motions to support said framed platform more importantly to level the frame platform carrying user, load, or vehicle chassis in vertical position to obstruct tipping, methods including; a wheel motor for steering from 0 degree-360 degrees achieving forward or reverse direction at 180 degrees, also parallel directions at 90 degrees and 270 degrees, and also traverse directions at 45 degrees and 225 degrees, and utilizing a universal joint for lateral pivoting motion from 1 degree up to 90 degrees thus rocking fore and aft to balance the framed platform, transmission rod mechanism for vertical lift and lowering actuation to stabilize the framed platform, and raise the platform higher which are placed accordingly for stability and motion control to maneuver a robotic omniwheel array independently and synchronized groups.

Prior art does not discuss a robotic omniwheel array such as this comprising a robotic omniwheel array which can be autonomously navigated and manually controlled by a smart cell phone device with navigation control via user interface with verbal command, and also with manual navigation comprising various remote controllers with maneuvering toggle and switches, and also by a control panel with touch screen monitor to control the robotic omniwheel array when user is onboard, nearby or from afar.

SUMMARY OF THE INVENTION

The present is a robotic omniwheel array comprising an in wheel motor supported by hub and axle assemblies suspended by strut and yoke assemblies which can be coupled with active components such as a steering motor device, a universal joint mechanism, and a motorized rod mechanism for support which are managed by the drive logic and navigation monitoring systems working in a synchronized manner for transport motion thus allowing the robotic omniwheel to steer, pivot fore and aft, and also to lift and lower by vertical expansion motions to continuously level the framed platform.

The robotic omniwheel array drive logic system comprises a control system for navigating a vehicle with aforesaid modular components via a user to drive vehicle with manually and autonomous drive system methodologies which can include wired and wireless remote control, and a CPU computer for communication monitoring components including; a laser radar system for obstacle avoidance, a GPS device for location awareness, a status control system having a plurality of sensor array which are placed accordingly for stability and motion control and an array of retractable wiring and power cable with plugs, accordingly the assemblies parts can be purchased from the manufacturer or from stores.

BRIEF DESCRIPTION OF THE DRAWINGS

These and other objects and advantages of the present invention a robotic omniwheel will become more fully apparent from the following detailed description when read in conjunction with the accompany drawings with like reference numerals indicating corresponding parts throughout.

DETAILED DESCRIPTION OF THE PREFERRED EMBODIMENTS

Hereinafter, a robotic omniwheel will be described in details with reference to the drawings and assigned the same reference numerals.

Figure 1:
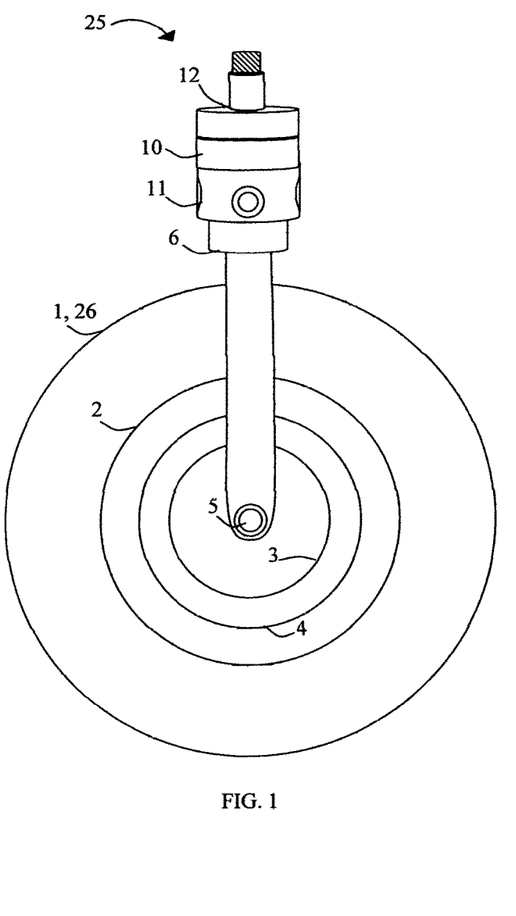
FIG. 1 shows depictions of a robotic omniwheel array for transport applications comprising omni directional rocker arm and vertical extension assemblies for holonomic motion.

Referring now in greater detail FIG. 1 a robotic omniwheel 25 for motion applications comprising an omniwheel frame 1 fixed to in wheel motor assemblies comprising a motor 2 having stator and rotor and brake device 3, supporting hub assemblies 4 with lug nut 5, double strut armature and yoke assemblies 6 which are turned by a motor device 10, which is set under the powered universal joint module 11 (or U joint), the mechanical transmission rod 12 (or lift actuator module) is set above the steering motor FIG. 1 shows a robotic omniwheel 25 the yoke module 6 upper section is to couple onto the lower section of the powered universal joint module 11 (or U joint), the motor device 10 which is set on top of the powered universal joint module 11 to control steering accordingly this scheme is fitting to rotate accurately and lastly the mechanical transmission rod 12 (or lift actuator module) is set above the steering motor 10.

Figure 2:
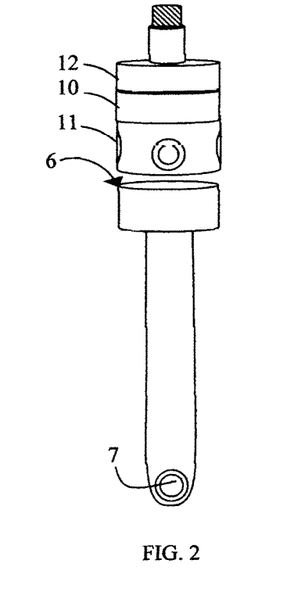
FIG. 2 shows depictions of a robotic omniwheel array for applications.
Figure 3:
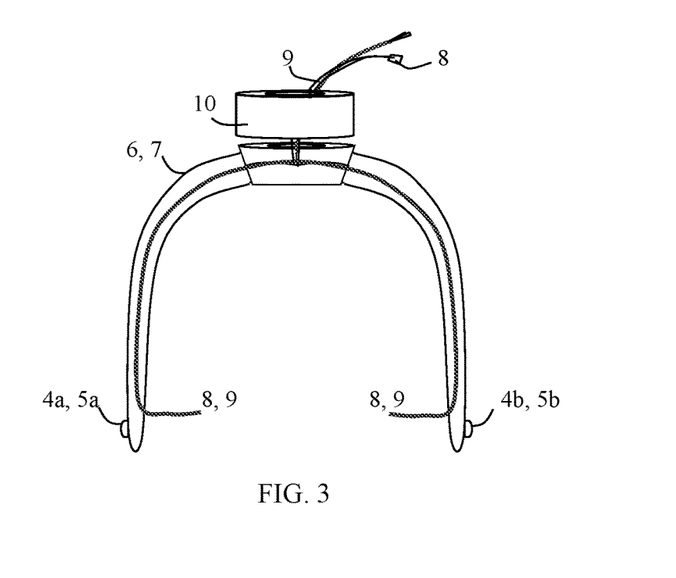
FIG. 3 shows a depiction for a yoke and strut having hollow conduit and wiring.

Referring now in greater detail FIG. 2 illustrates the hollow yoke 6 and fork like strut is having hollow conduit 7 to furnish cable 8 and electrical wiring 9, the yoke can be couple with either of the following transport applications: a motor device 10, a universal joint mechanism 11, and a transmission rod mechanism 12 which steer, spin, pivot and rock the omniwheel fore and aft in a holonomic manner. The robotic omniwheel's yoke and strut armature as in claim 13, further comprising:

a cantilevered shaped arm having a hollow conduit shape with elongated section with ample space to allow threading access between the upper and lower strut ends to thusly connect aforesaid wiring, sensor, and UBS power cable accordingly, or fuels lines (not shown) accordingly to furnish power to drive the omniwheel motor, brake, and sensor array, said strut contained wiring array is to prevent snagging damage and to visually conceal the cabling (as FIG. 3 illustrates), two fork shaped strut arms to contain wiring in both conduit sections and to thusly allow threading access between the upper and lower the yoke module's opening ends accommodating the threading of said wiring, sensor the UBS power cable and fuels lines between the upper and lower yoke hollow opening section accordingly end to end to thereby concealing cabling from view also to protect from damage (as FIG. 3 illustrates).

Referring now in greater detail FIG. 3 a robotic omniwheel array for transport motion states comprise strut and yoke assemblies to support the hub assemblies 4, and as shown the yoke with strut armature can indirectly be coupled with the motor device 10 for steering motions. The strut's hollow armature comprising internal conduit 7 can house USB 8 cable and electrical wiring 9 and fuel lines which are not shown.

Prospectively robotic omniwheel array can be navigationally controlled by means of the drive logic 15, 16 and 17 control systems and also manually via wireless remote control components 20, 21, and 22 controls the power system furnishing electricity to activate the in wheel motor 2, brake 3 and steering motor 10.

Figure 4:
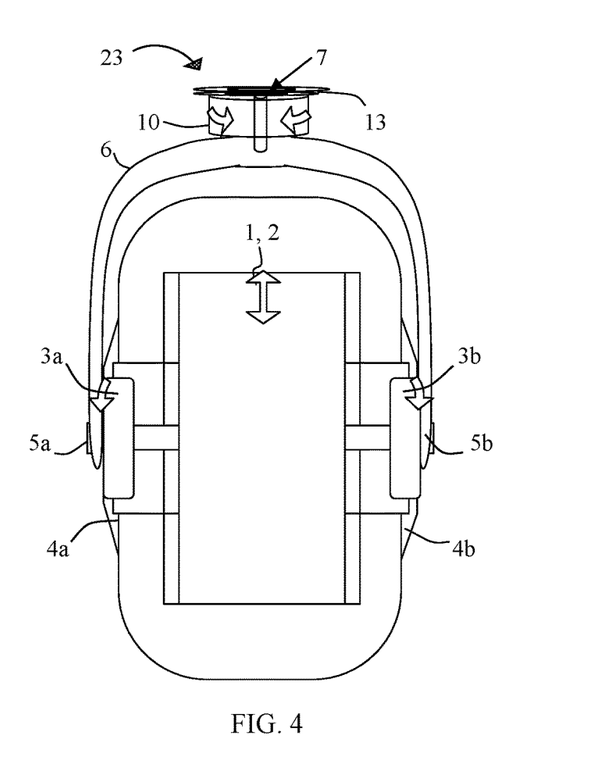
FIG. 4 shows a front view depiction of a robotic omniwheel array for motion applications comprising and omniwheel frame fixed to in wheel motor assemblies with supporting hub, double strut armature with yoke assemblies and motor device for holonomic motion.

In greater detail FIG. 4 shows a front view depiction for robotic omniwheel assemblies 23 comprising an omniwheel frame 1 fixed to in wheel motor assemblies 2 with brake 3 and supporting hubs 4 and lug bolts 5*a* and 5*b* assemblies, double strut armature with yoke assemblies 6 and motor device 10 for holonomic motion to thus travel about omnidirectional for transport applications.

A robotic omniwheel frame 1 comprising an in wheel motor includes a brake 3, that is supported by the hub 4*a* and 4*b* and when activated applies pressure onto said hubs to slow and stop forward and reverse thrust momentum therein.

The yoke with strut assemblies 6 can be couple onto the motor device 10 to steer on point and while the drive components within the omniwheel frame work. Thusly a flange plate 13 can be coupled onto the motor device 10 for steering motion, and thus these robotic omniwheel assemblies are numbered 23 which subsequently can become connected with a frame 14 via a flange bracket having bearings and fastening bolts 13.

Figure 7:
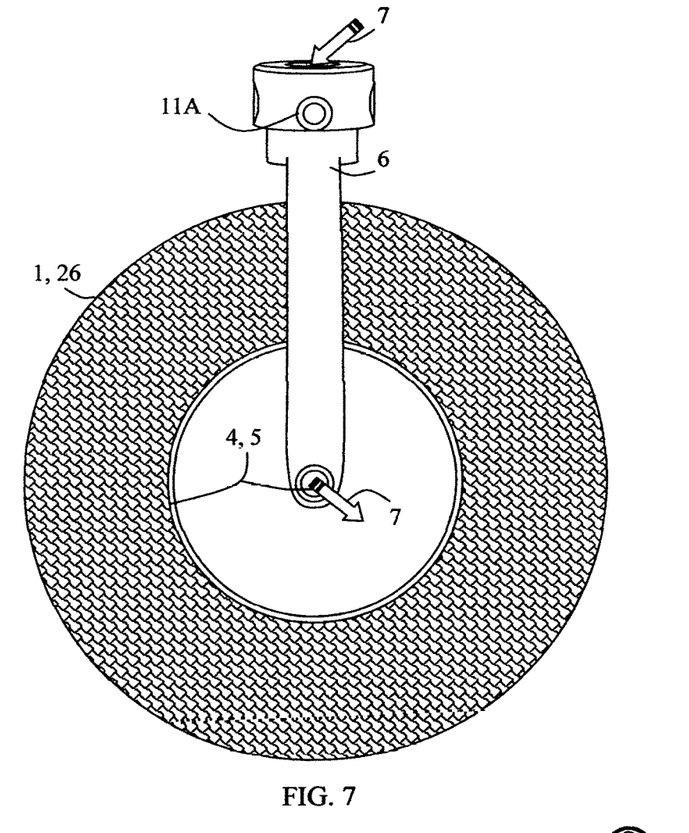
FIG. 7 shows the top portion of the U joint coupler.

The omniwheel apparatus system comprising connection methods to couple the upper yoke section onto the framed platform which can contain said power and control systems, and also connecting one or more of the following modules onto the yoke module in any order;

the upper yoke section coupled onto the steering module and to a flange mounting (as FIG. 4 illustrates), thus the omniwheel apparatus system is for controlling robotic motion states which can comprise: one or multiplied actuation methods including synchronized steering, rocking and lifting motions to support said framed platform more importantly to level the frame platform carrying user, load, or vehicle chassis in vertical position to obstruct tipping, methods including: said wheel motor for steering from 0 degree-360 degrees achieving forward or reverse direction at 180 degrees, also parallel directions at 90 degrees and 270 degrees, and also traverse directions at 45 degrees and 225 degrees, as well the upper section of the yoke with a connection to the universal joint module (as FIG. 7 illustrates).

Figure 5:
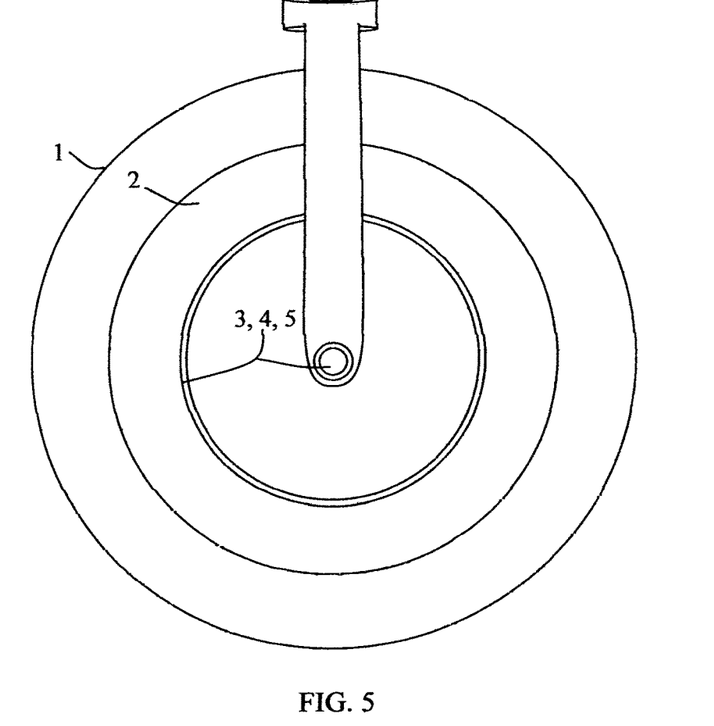
FIG. 5 shows a side view depiction of the omniwheel array encompassed with a tire.

Referring now in greater detail FIG. 5, a robotic omniwheel array for transport motion comprising wheel frame 1 assemblies supported by strut armature 6 having therein hollow conduit 7 to thus furnish cable and electrical wiring to the in wheel motor device 2 including a brake 3 there through the hub assemblies 4 and subsequently the in wheel and hub assemblies are firmly positioned therein via the lug bolts 5 continuous pressure.

The heavy duty wheel frame is having a preferred circumference size affixing onto at least one drive motor device which is thereby securely fixed on axis via hub assemblies, a drive motor may be an electric hub motor or the like with braking assembly. The hub motor and wheel frame assemblies include axle rods and bearings which are protected by a tightly sealed hub cap, and thusly said hub is to rotate on a strut arm axis hub bearing fastened by locking nut (as shown in FIGS. 5 and 6).

Figure 6:
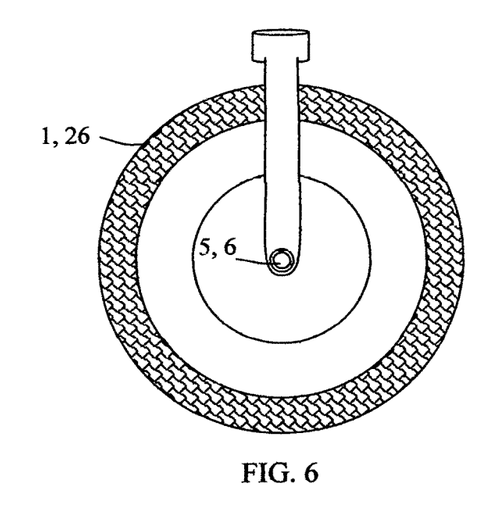
FIG. 6 shows a side view depiction for the motorized universal joint assemblies.

Referring now in greater detail FIG. 6 omniwheel wheel frame 1 shows the wheel frame outer surface encompassed with a tire 26, and may also be shaped to fit on rail or a track system and other shapes and sizes. The robotic omniwheel strut and yoke assemblies 6 can be coupled onto a supportive apparatus such as a framed platform, said wheel frame and said framed platform are made from durable metal, plastic composite materials, carbon fiber or the like to form a geometric shape which is heavy to support above a platform or chassis, said frame's underside accordingly to couple by bolting an arrangement of omniwheel apparatus.

Accordingly the omniwheel's motor array are protected by a hub cap that is fixed onto the inner rim with lug and bolt methods to create a tight seal for protection; the wheel frame's outer rim also comprising a treaded inflated tire thereon the treaded tire peripheral surface allows planar roll motions, or a non-inflatable tire, a metal rail wheel, a track wheel, and other shapes and sizes, as well said hub and lug to rotate on axis rod bearings and supported by the strut arm fixed thereon with said lug bolt and nut methods.

Referring now in greater detail FIG. 7 shows the motorized universal joint assemblies 11A for yoke rocking motion. The robotic omniwheel the hub assemblies 4, 5 are firmly positioned therein and couple with strut and yoke assemblies 6 for suspension and thusly be coupled onto a supportive apparatus. The upper section of said universal joint module is a connected to the lower section of the steering module (as FIG. 9 illustrates), and accordingly the U joint rocking motion achieves vertical lift and lowering actuation which stabilizes and balances the framed platform above, thusly raising the platform up higher and down lower.

Figure 8:
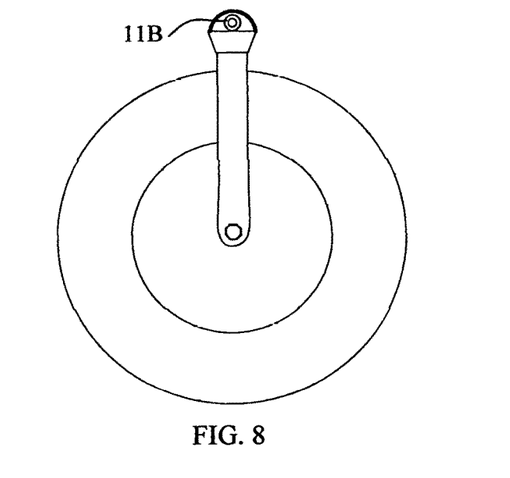
FIG. 8 shows a side view depiction for the U joint coupled with the struts yoke frame.
Figure 12:
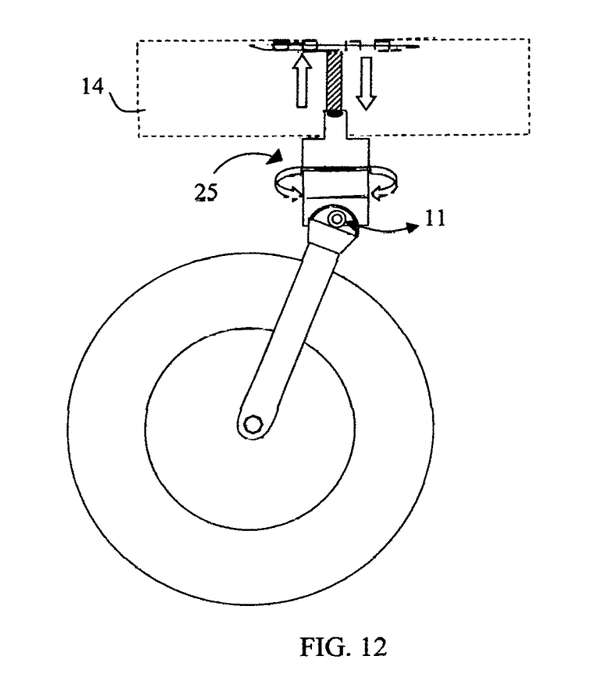
FIG. 12 is a prospective view of robotic omniwheel array showing arrows for said U joint coupled onto the yoke top, thus arrows show pivoting motion and steering motor motion.

Referring now in greater detail FIG. 8 shows the powered universal joint 11B affixed to the robotic onmiwheel array for fore and aft pivoting motions as illustrated in FIG. 12.

Figure 9:
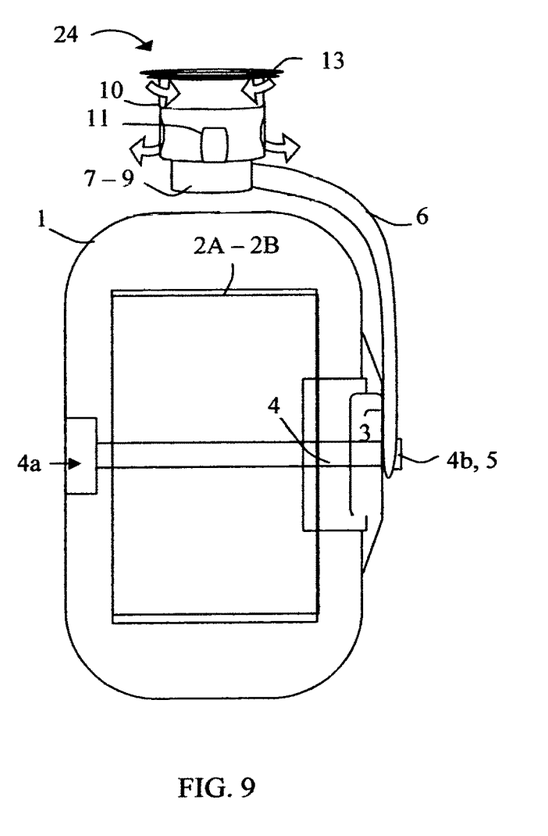
FIG. 9 is a prospective view of robotic omniwheel array.

Referring now in greater detail FIG. 9 shows a robotic omniwheel array for motion applications comprising an omniwheel frame fixed to in wheel motor assemblies with supporting hub, single strut armature 6 with yoke shows conduit 7 furnishing cable and electrical wiring for the universal joint mechanism 11, additionally connected with the motor device 10 to steer, spin, pivot and rock fore and aft and thusly becomes connected with frame 14 via a flange bracket having bearings and fastening bolts 13 to spin freely for steering motion thus this robotic omniwheel array is numbered 24.

Figure 10:
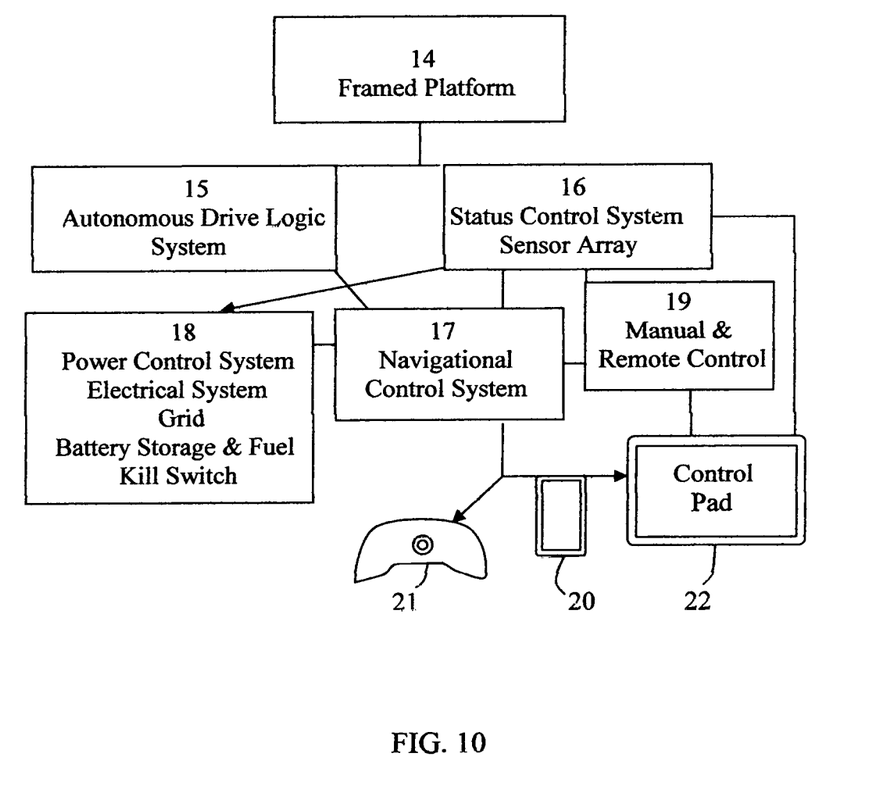
FIG. 10 is a side view of a flowchart diagram depicting control scheme whereby, a frame or chassis are to house the drive logic system and the navigational control system in communication which manages and monitors braking and velocity levels and the turning range within the mechanisms and motors.

Prospectively robotic omniwheel array can be navigationally controlled by means of the drive logic 15, 16 and 17 control systems and also manually via wireless remote control components 20, 21, and 22 controls the power system furnishing electricity to activate the in wheel motor 2, brake 3 and steering motor 10 and importantly disengages power to stop velocity throttle via a kill switch to stop (shown in FIG. 10 flowchart).

The universal joint mechanism is connected with the motor device 10 steers on point. The active U joint pivots fore and aft as the motor device 10 steers on point while driving in forward and in reverse motions. Thusly a flanged plate and bolts for coupling support 13 not fixed for vertical range of motion can be coupled with the motor device 10 and subsequently can couple onto a frame 14 via the flanged plate and fastening bolts 13, thus robotic omniwheel assemblies having the same are numbered 24 which may or may not comprise a tire with tread 26.

Figure 11:
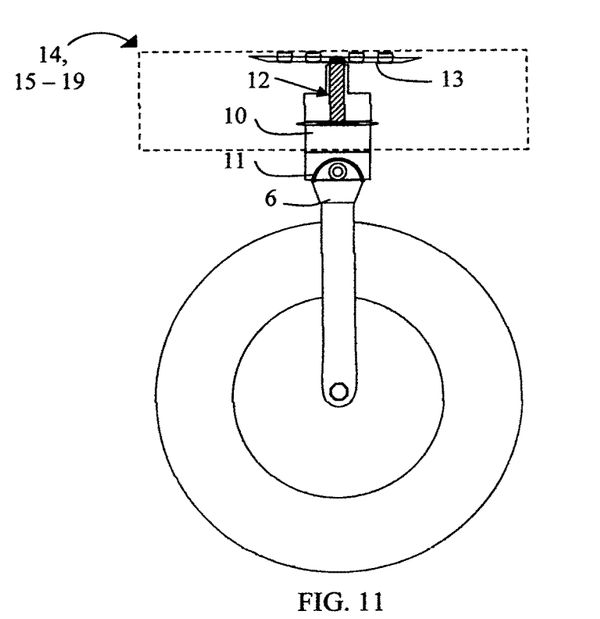
FIG. 11 is a prospective view of robotic omniwheel array showing a motorized extension application.

Said universal joint for lateral pivoting motion from 1 degree up to 90 degrees thus rocking fore and aft to balance the framed platform and a connection method to couple to the yoke, the universal joint module and the steering module to the transmission rod mechanism and said flange mounts above said framed platform's lower portion (as FIG. 11 illustrates).

Referring now in greater detail FIG. 10 the coupled frame 14 indirectly is to house the drive logic system as the flowchart defines a scheme shows communication, and the navigational control system in communication a cell phone device or with remote controller to manage and monitor braking and velocity levels within the wheel frame assemblies and to manage and monitor the turning range within the mechanism 10 motor which can have zero degree motion and requires slow cog rotation for steering on point, and manage and monitor the turning range within the mechanism 11 universal joint to pivot fore and aft with limited range of motion, and also manage and monitor the turning range within the mechanism 12 a transmission rod which requires active gear drive to thusly lift and extend thus reaching upward to a preferred height for raising and lowering a framed platform (as FIG. 12 shows with motion arrows).

Accordingly depending on the transport task the drive logic system 15 may or may not include laser radar for obstacle avoidance, GPS for location awareness, and also the drive logic system 15 including a status control system with sensor array 16 which are placed accordingly. The drive logic modes and microprocessors communicate via USB 8 connections for accessing and administering drive logic and manual commands to said mechanisms 2, 3, 10, 11, 12.

Prospectively robotic omniwheel array can be navigationally controlled 17 systems and also manually via wireless remote control components controls the power system 18 furnishing electricity to activate the in wheel motor 2, brake 3 and steering motor 10 and importantly disengages power to stop velocity throttle via a kill switch to stop. The drive logic system includes an electrical system 18 which maintains charge to a battery bank and includes a grid charge access plug. The power supply control system 18 provides AC voltage DC voltage via electric wire 9 and also depending on the transport task fuel power via fuel lines may be applied (not shown).

The drive logic navigation control system 17 comprising wired and wireless communication with receivers manage mechanisms 2, 3, 10, 11, 12 and drive logic components 15-17 having the same either by navigation by a cell phone device 20 and by a remote controller with maneuver toggle 21 and switches, and a remote control panel with touch monitor 22 thusly estimating motion states and for path planning.

The robotic omniwheel array can be autonomously controlled and manually controlled via wired and wireless control systems nearby and from a far.

A method of control whereby user can utilize a smart cell phone device and by a hand held control panel with verbal command and digital navigation to navigate the robotic omniwheel array by maneuvering hands to touch screen (likened to an IPad) control panel device with digital driving scheme.

A remote control panel with touch monitor 22 thusly estimating motion states and for path planning.

The robotic omniwheel array can be autonomously controlled 15 and manually controlled 19 via wired and wireless control systems nearby and from a far via a wireless telecommunication control system comprising various user interface control devices with voice control, touch control including (digital) toggles, switches, and the like.

User 19 can utilize a smart cell phone device with verbal command and digital navigation to navigate the robotic omniwheel array by maneuvering hands to touch screen control (like an IPad).

A convention method of control whereby user navigates the robotic omniwheel manually 19 with foot petals and steering wheel method comprising linkage, gears, belts, and the like.

Referring now in greater detail FIG. 11 shows the entire robotic omniwheel 25 for motion applications comprising an omniwheel frame fixed to in wheel motor assemblies with supporting hub, single strut armature 6 with yoke shows conduit 7 furnishing cable and electrical wiring for the universal joint mechanism 11, additionally connected with the motor device 10 to steer on point, spin, pivot and rock fore and aft, and thusly connected with a frame with a flanged plate and bolts for coupling support 13 to spin freely for steering motion and subsequently become connected with a transmission rod mechanism 12 can lift and extend frame 14.

The universal joint mechanism connected with the motor device 10 steers on point consecutively as the active U joint 11 pivots fore and aft that also for steering on point thus allowing rocking motions and to travel about omni-directional, and thusly a flanged plate 13 is thusly coupled onto the transmission rod mechanism for lifting motions these robotic omniwheel assemblies are numbered 25 which can support a preferred frame application.

Referring now in greater detail FIG. 12 the robotic omniwheel depiction shows arrows for the universal joint's pivoting motions and for the yoke's spinning motions to steer the omniwheel apparatus, and the robotic omniwheel array depiction shows arrows for the universal joint mechanism connected with the motor device 10 which steers on point as the active U joint 11 pivots fore and aft at the same time it is steering on point allowing rocking motions for steady transport.

The various embodiments specified vehicle contents describe in generic terms and are not technologically precise and thusly as claimed remains within accordance of the spirit the present invention, and it is apparent to those skilled in the art that many more entailed nuances are possible within the scope of the invention.

The invention claimed is:

1. The robotic omniwheel apparatus system comprising: an omniwheel apparatus comprising: a wheel frame housing a hub motor with brake, a motor controller, microprocessors and sensor devices for controlling motion, a hub assemblies including; an axle rod, bearings, bolts, a hub cap with lug nuts,
a yoke array with strut and hollow conduit to contain prewired USB power cable connections and motion sensors by plugging directly into omniwheel apparatus and other modules,
a first connection method by affixing the yoke's strut end opening to couple directly to an omniwheel apparatus hub, said yoke array is further comprising:
a second connection method to couple an upper yoke section to at least one of the following module array in any order;
the upper yoke section coupled onto a steering module and to a flange mounting,
the upper section of the yoke with a connection to a universal joint module,
an upper section of said universal joint module which is a connected to the lower section of the steering module,
a third connection method to couple to the yoke to the base of the framed platform thusly supporting the module array, and also comprising a compartment to house the robotic omniwheel control system comprising wherein:
a CPU control system and autonomous drive logic control for tracking and monitoring robotic omniwheel assembly devices including; a wireless processing arrangement, GPS mapping, lidar device, radar scanner systems, sensor array, and also utilizing a wireless telecommunication motion control system comprising user interface control devices in a communication arrangement for transmitting and receiving positional signals to selectively activate robotic drive motion, and
a power control system, a battery bank and a charger device, a retractable USB power cable, sensors, wiring, plugs and fuel systems.

2. The omniwheel apparatus system of claim 1 for controlled robotic motion states comprising: synchronized steering, rocking and lifting motions to maneuver the framed platform, methods including:
controlling actuation of said wheel motor accordingly steering from 0 degree-360 degrees thusly achieving forward and reverse direction at 180 degrees, also achieving parallel directions at 90 degrees and 270 degrees, and also achieving traverse directions at 45 degrees and 225 degrees,
controlling pivoting actuation of said universal joint mechanism for lateral pivoting motion from 1 degree up to 90 degrees thus rocking fore and aft to balance the framed platform,
controlling telescoping actuation of said transmission rod mechanism for vertical lift and lowering motions to stabilize the framed platform.

3. The framed platform of claim 1 further comprising: frame bolts to connect flange bracket via bolts onto the yoke array's steering motor, motorized universal joint motor, and motorized transmission rod which are plugged in to the power control system, thus said frame is made from metal, plastic composite materials, carbon fiber to form a geometric shape.

4. A robotic drive system for controlling the omniwheel apparatus of claim 1, the robotic drive system comprising a processor configured to extract control information of at least one telecommunication device from coded information; and
a network interface configured to modulate the control information extracted by the processor based on a communication type of the user cell phone device and output the modulated control information, and
a wireless telecommunication control system comprising user interface control devices with voice control, touch control including digital toggles, switches, and
a user smart cell phone device with verbal and digital navigation control methodology to navigate the robotic omniwheel array by maneuvering drive control via a user in a hand held manner whilst on board or from afar,
a wireless hand held remote controller device with navigation control methodology with touch screen monitor with navigation control methodology for visual and verbal control of said robotic omniwheel array.

5. A robotic omniwheel system of claim 1 further comprising manual drive control methodology to navigate the robotic omniwheel array diversely situated in a chassis with manual navigation by utilizing a steering wheel comprising linkage, gears, belts, and also by speed and brake pedals.

\* \* \* \* \*